(12) United States Patent
Simon et al.

(10) Patent No.: US 6,575,001 B1
(45) Date of Patent: *Jun. 10, 2003

(54) CONTROL PEDAL DISABLING DEVICE

(75) Inventors: David A. Simon, 21711 Eastbrook Ct., Grosse Pointe Woods, MI (US) 48236; Michael T. Laba, Troy, MI (US)

(73) Assignee: David A. Simon, Harrison Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/686,220

(22) Filed: Jul. 23, 1996

Related U.S. Application Data

(63) Continuation-in-part of application No. 08/112,555, filed on Aug. 26, 1993, now Pat. No. 5,537,846.

(51) Int. Cl.⁷ .................................................. G05G 5/00
(52) U.S. Cl. .............................. 70/202; 70/201; 70/237
(58) Field of Search .................... 70/798, 199, 201, 70/202–204, 205, 254, 237–239

(56) References Cited

U.S. PATENT DOCUMENTS

| | | | |
|---|---|---|---|
| 777,611 A | 12/1904 | Dodge | |
| 1,097,081 A | 5/1914 | Cooon | |
| 1,267,926 A | 5/1918 | Snow et al. | |
| 1,343,870 A * | 6/1920 | James | 70/199 |
| 1,388,149 A | 8/1921 | Friedrich | |
| 1,442,203 A | 1/1923 | Williams et al. | |
| 1,477,165 A * | 12/1923 | Dobbelaar | 70/199 |
| 1,531,062 A | 3/1925 | Barravecchia | |
| 2,216,858 A | 10/1940 | Steinbrink | 144/296 |
| 2,317,195 A | 4/1943 | Husted | 144/303 |
| 2,812,789 A | 11/1957 | Hutson | 144/305 |
| 2,973,792 A | 3/1961 | Fonken | 144/303 |
| 3,435,646 A | 4/1969 | Michnoff | 70/203 |
| 3,550,409 A | 12/1970 | Pariser | 70/203 |
| 3,719,063 A * | 3/1973 | Fouces | 70/202 |
| 4,076,095 A | 2/1978 | Adamski | 180/114 |
| 4,333,326 A | 6/1982 | Winters | 70/203 |
| 4,493,198 A | 1/1985 | Brown | 70/203 |
| 4,696,172 A * | 9/1987 | Farrow | 70/238 |
| 4,730,470 A * | 3/1988 | Zane | 70/211 |
| 4,732,019 A | 3/1988 | Tolar | 70/203 |
| 4,876,865 A | 10/1989 | Trinidad et al. | 70/203 |
| 4,974,433 A * | 12/1990 | Wang | 70/211 |
| 4,995,250 A | 2/1991 | Chiou | 70/238 |
| 5,113,672 A * | 5/1992 | Wang | 70/211 |
| 5,213,388 A | 5/1993 | Baker | 296/65.1 |
| 5,267,458 A * | 12/1993 | Heh | 70/199 |
| 5,329,793 A * | 7/1994 | Chen | 70/238 |
| 5,345,796 A | 9/1994 | Chieh et al. | 70/202 |
| 5,426,962 A * | 6/1995 | Kuo | 70/199 |
| 5,537,846 A | 7/1996 | Simon | 70/202 |

* cited by examiner

*Primary Examiner*—Gary Estremsky
(74) *Attorney, Agent, or Firm*—Carlson, Gaskey & Olds

(57) ABSTRACT

A motor vehicle anti-theft device adapted to disable the brake pedal of the vehicle. The device includes a tubular strut with an opening sized to receive the pedal arm of the brake pedal and a lock bar which may be slid forwardly following movement of the pedal arm into the opening to trap the pedal arm in the opening. The device further includes an actuator rod and a strut rod interconnected by a gear and rack structure so that rearward movement of the actuator rod generates forward movement of the strut rod to plant a foot carried on the forward end of the strut rod against the fire wall of the vehicle following entrapment of the pedal arm. A lock structure is provided to preclude retraction of the lock bar and to preclude retraction of the strut rod.

13 Claims, 9 Drawing Sheets

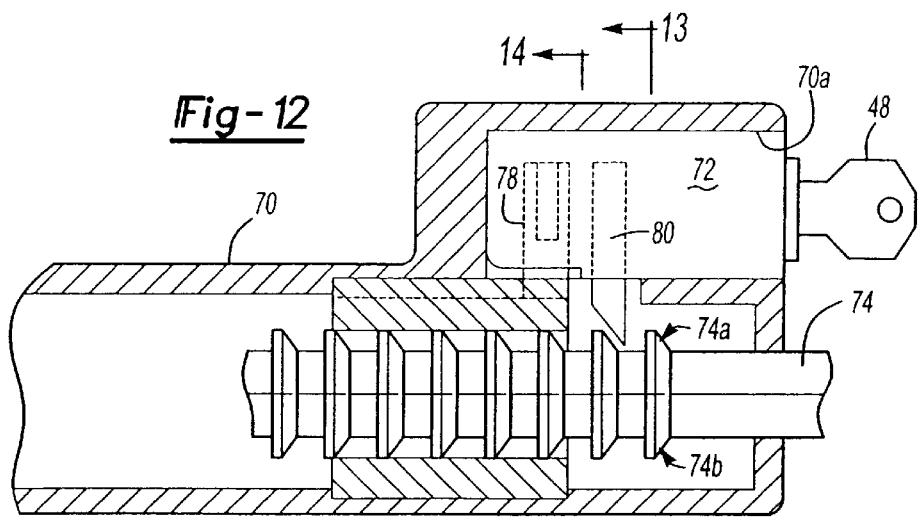
Fig-12
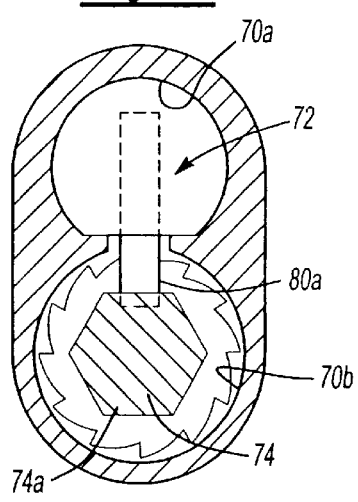
Fig-13
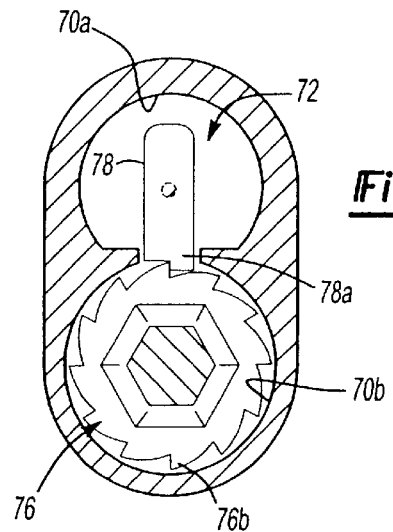
Fig-14
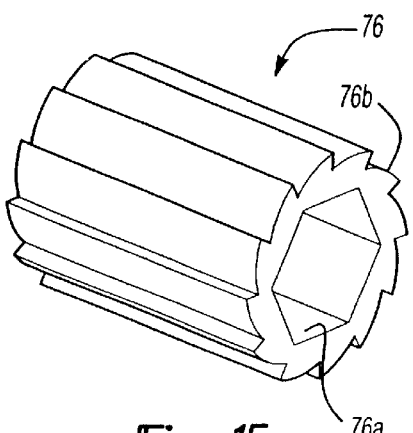
Fig-15
Fig-16

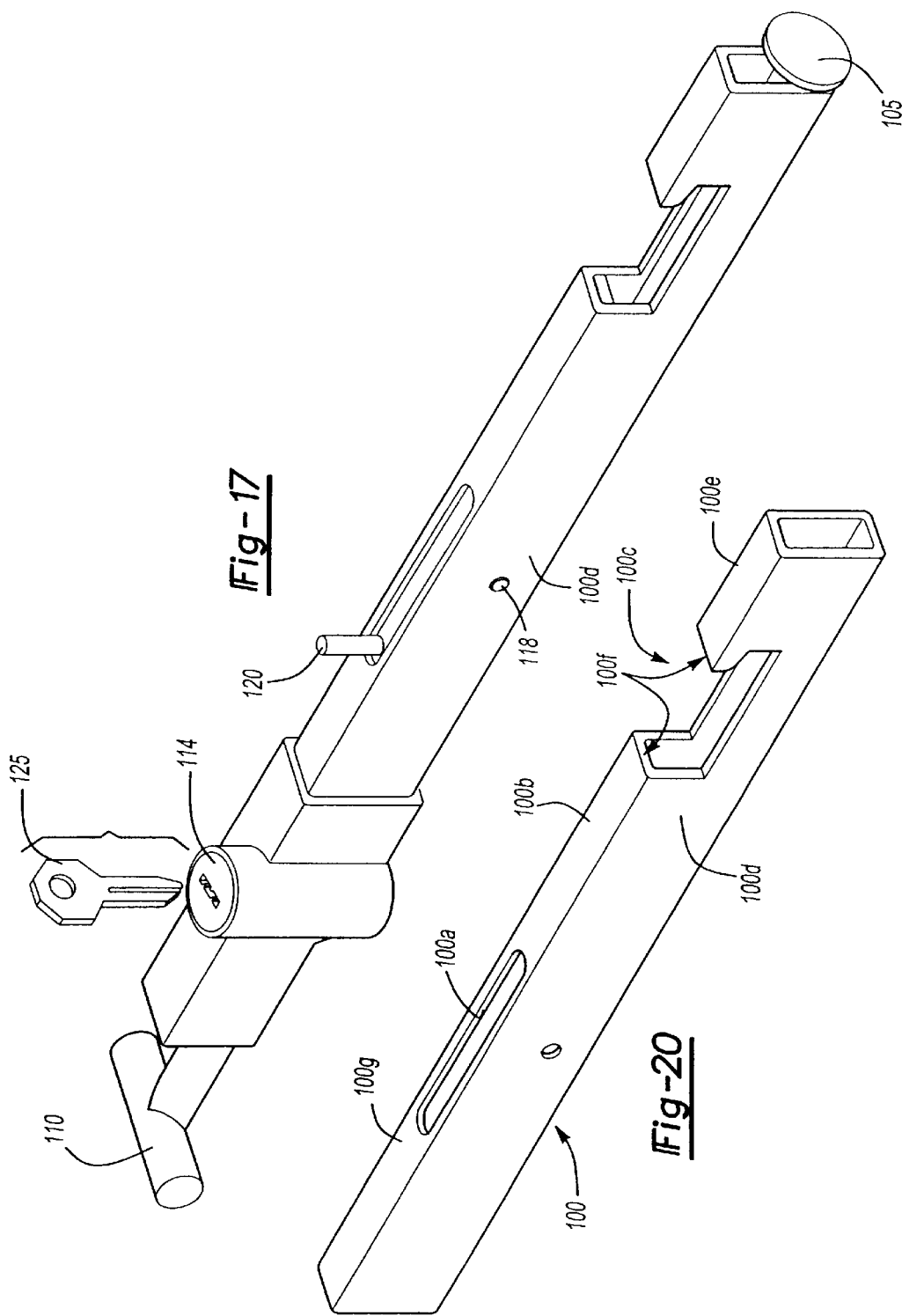

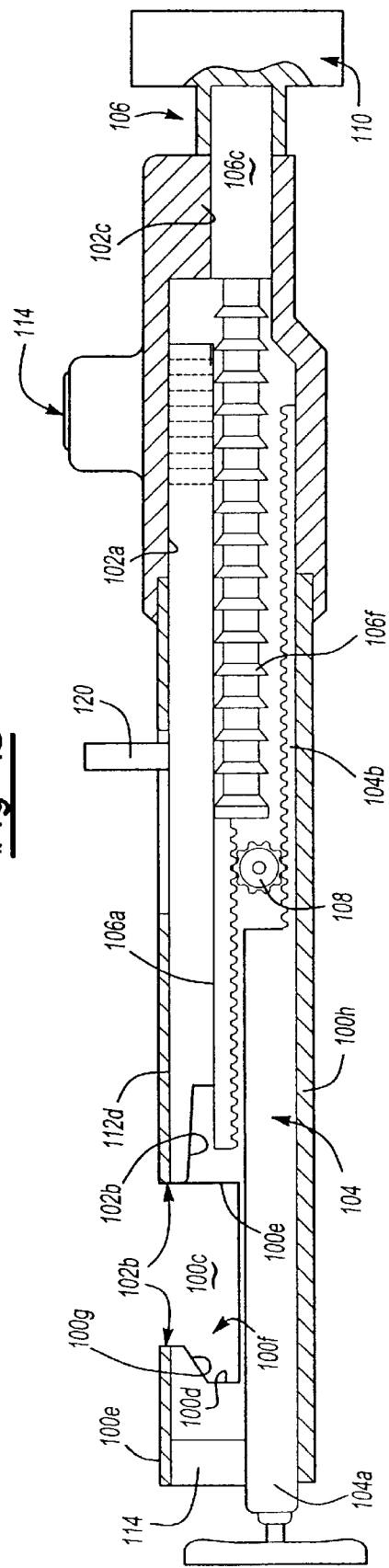

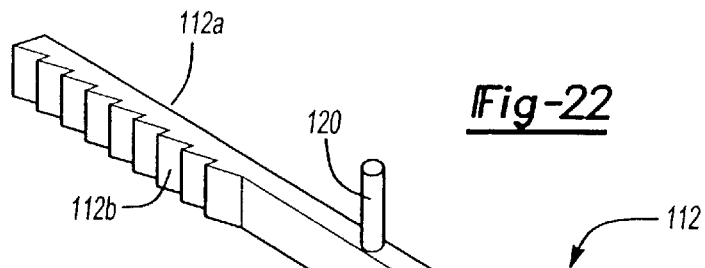
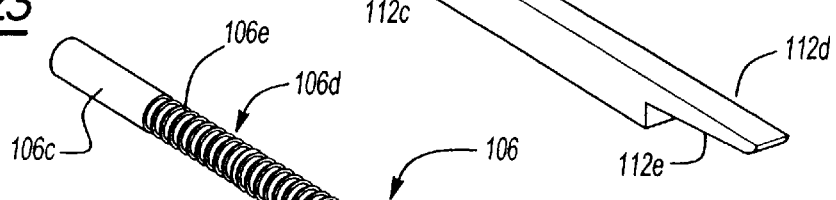
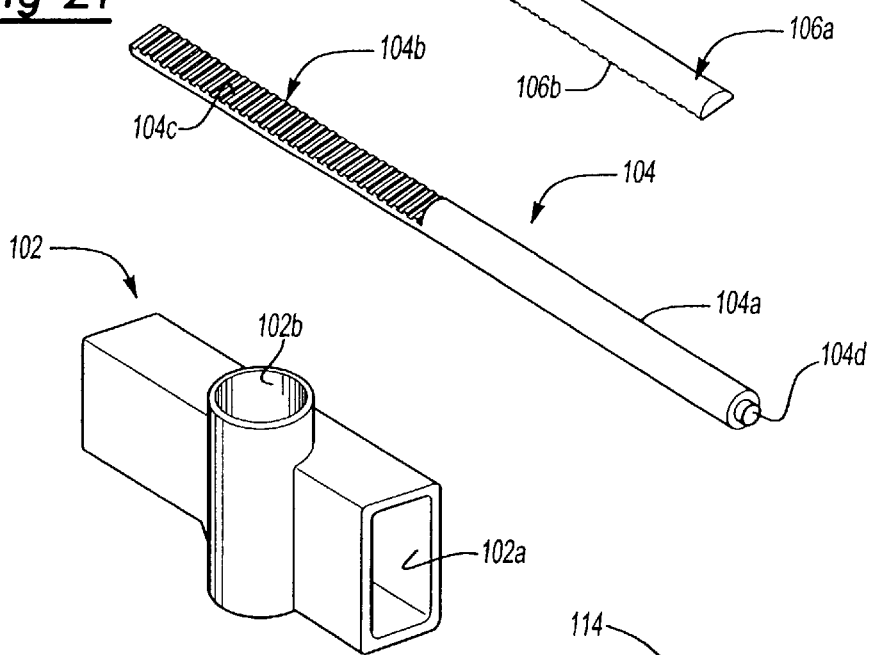
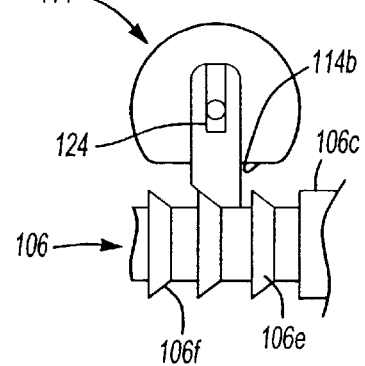

CONTROL PEDAL DISABLING DEVICE

RELATED APPLICATION

This application is a continuation-in-part of U.S. patent application Ser. No. 08/112,555 filed on Aug. 26, 1993 now U.S. Pat. No. 5,537,846.

BACKGROUND OF THE INVENTION

This invention relates to locking devices for motor vehicles and more particularly to a motor vehicle anti-theft device which disables the brake pedal of the motor vehicle.

Many anti-theft devices have been proposed to prevent the theft of motor vehicles. The prior art devices include alarm devices which sound an audible signal upon an attempt to force entry into the vehicle, various devices to disable the steering mechanism of the vehicle, various devices to preclude operation of the control pedals of the vehicle, and various devices interlocking a control pedal and the steering wheel to preclude operation of either. However, the alarm devices are relatively easily defeated by a knowledgeable thief and the various devices disabling the control pedal and/or steering wheel are relatively easily defeated by suitable shearing or snipping tools.

SUMMARY OF THE INVENTION

This invention is directed to the provision of an improved anti-theft device and methodology for a motor vehicle.

More specifically, this invention is directed to the provision of an improved anti-theft device and methodology for a motor vehicle which is simple and inexpensive in construction and which is very difficult for even a very experienced and knowledgeable thief to defeat.

The invention anti-theft device is of the type that disables a control pedal of the vehicle to preclude operation of the control pedal. According to the invention, the device includes an axially extending strut structure having a forward foot portion; a disabling structure mounted to the strut structure and configured to be positioned on opposite sides of a portion of the pedal assembly to disable the pedal assembly; means mounting the strut structure for axially forward movement relative to the disabling structure; and means for locking the strut structure and the disabling structure against contracting axial movement. With this arrangement, and following positioning of the disabling structure on opposite sides of the pedal assembly portion, the strut structure may be moved axially forwardly relative to the disabling structure to move the foot portion into engagement with the vehicle fire wall whereafter the strut structure may be locked relative to the disabling structure to totally disable the pedal.

According to a further feature of the invention, the disabling structure includes a lock member movable relative to another portion of the disabling structure; the locking means includes a key lock having first and second extendable strikers movable to retracted positions by the key; the first striker is operative when extended to preclude movement of the lock member; and the second striker is operative when extended to preclude axial movement of the strut structure relative to the disabling structure. This arrangement allows a single key to be utilized for locking the lock member as well as the strut structure.

According to a further feature of the invention, the pedal assembly includes a pedal arm and a pedal pad; the disabling structure is intended to be positioned on opposite sides of the pedal arm; the disabling structure defines an opening sized to receive the pedal arm and having an entrance throat; and the lock member comprises a lock bar mounted for movement between an open position in which the entrance throat is open to allow insertion of the pedal arm into the opening and a closed position in which the bar obstructs the entrance throat to trap the pedal arm in the opening. This arrangement provides a simple and inexpensive means of trapping and disabling the pedal arm of the pedal assembly.

According to a further feature of the invention, the disabling structure includes an axially extending tubular member; the opening is defined in the tubular member; the lock bar is mounted for sliding movement within the tubular member between its open and closed positions; and the strut structure comprises an elongated strut rod including a rearward portion mounted for sliding movement within the tubular member and a forward portion extending forwardly from the forward end of the tubular member and attached to the foot portion. This arrangement provides a compact and inexpensive package.

According to a further feature of the invention, the device further includes a lock housing rigidly secured to a rearward end of the tubular member and defining a key lock cavity receiving a double striker key lock; the lock bar functions at its forward end, with the lock bar in its closed position, to block the entrance throat of the opening and includes a rearward end positioned proximate the key lock cavity and defining a detent structure; a first striker of the key lock is operative when extended to coact with the lock bar detent structure to lock the lock bar in its closed position; and the second striker of the key lock is operative when extended to preclude contracting axial movement of the strut rod relative to the tubular member. This arrangement provides a simple and positive locking arrangement with respect to both the lock bar and the strut rod.

According to a further feature of the invention, the device further includes an actuator rod positioned slidably within the tubular member and drive means operative in response to rearward movement of the actuator rod relative to the tubular member to generate forward movement of the strut rod relative to the tubular member; the actuator rod includes a detent portion positioned proximate the key lock cavity; and the second striker coacts with the detent portion of the actuator rod. This specific arrangement provides an effective means of moving the strut rod forwardly into engagement with the fire wall and providing releasable locking coaction between the second striker and the detent portion of the actuator rod.

According to a further feature of the invention, the drive means includes a rack structure at the forward end of the actuator rod, a rack structure at the rearward end of the strut rod, and a gear interposed between the rack structures and operative in response to rearward movement of the actuator rod to generate forward movement of the strut rod. This specific arrangement facilitates the forward movement of the strut rod in response to a simple rearward movement of the actuator rod.

The invention further provides a methodology for preventing theft of a motor vehicle of the type having a control pedal assembly spaced rearwardly from the fire wall of the vehicle. According to the invention methodology, a disabling device is provided including a disabling structure and an axially extending strut structure movable axially relative to the disabling structure and having a forward foot portion; the disabling structure is positioned on opposite sides of a portion of the pedal assembly to disable the pedal assembly; the strut structure is moved axially forward relative to the disabling structure to move the forward foot portion into engagement with the vehicle fire wall; and the strut structure and disabling structure are locked against contracting axial movement. This methodology provides a simple process for quickly and readily disabling the pedal.

According to a further feature of the invention methodology, the disabling structure includes a lock member movable relative to another portion of the disabling structure and the method includes the further step of moving the lock member relative to the other portion of the disabling structure. This methodology allows the disabling structure to firmly engage the pedal portion and firmly locks the disabling structure with respect to the vehicle fire wall.

BRIEF DESCRIPTION OF THE DRAWINGS

FIG. 2 is a cross-sectional view taken on line 2—2 of FIG. 1;

FIG. 3 is a view showing the components of the device in exploded relation;

FIGS. 12–16 are detail views showing a modification of the first embodiment of FIGS. 1–11;

FIG. 17 is a perspective view of a second embodiment of the invention device;

FIGS. 18 and 19 are cross-sectional and top views of the second embodiment;

FIGS. 20–24 are detail views showing components of the second embodiment; and

FIGS. 25–27 are detail views showing aspects of the operation of the second embodiment.

DETAILED DESCRIPTION OF THE PREFERRED EMBODIMENTS

Figure 1:
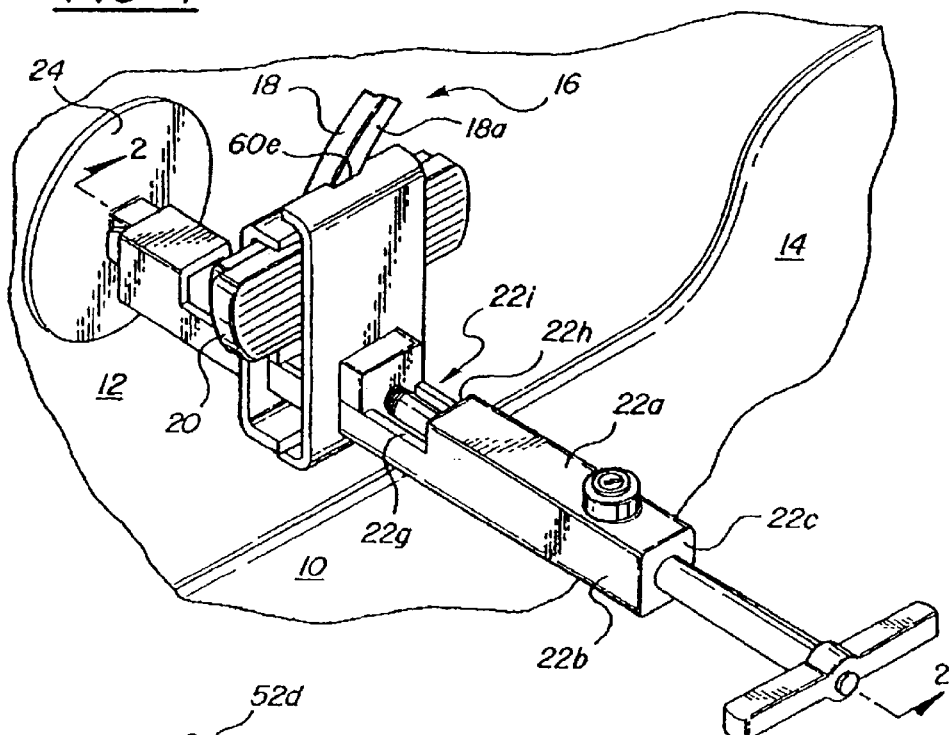
FIG. 1 is a perspective view of the first embodiment of the invention device shown in disabling relation to the brake pedal of a motor vehicle.
Figure 4:
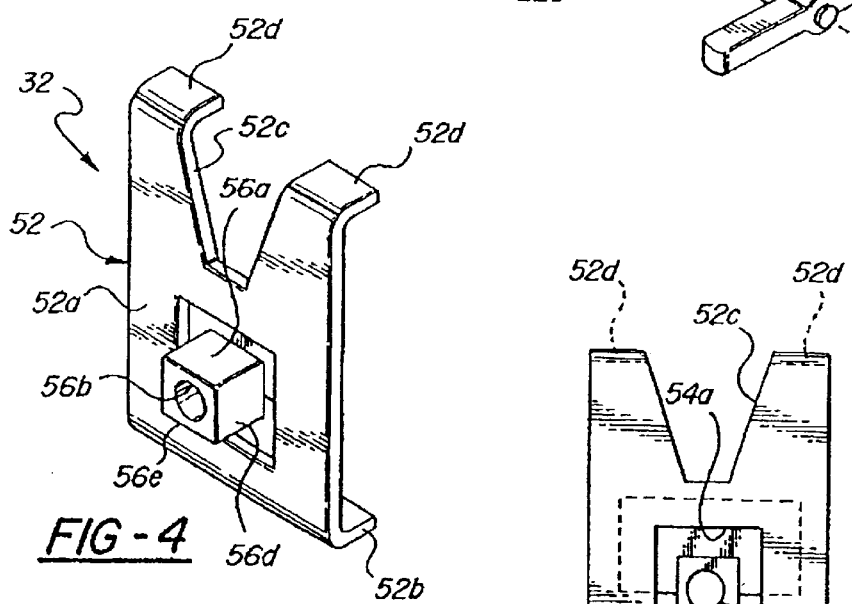
FIGS. 4, 5 and 6 are perspective, front and rear views of a front clamp structure utilized in the invention device.
Figure 5:
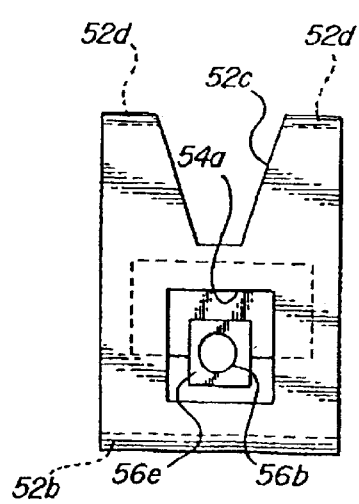
Figure 6:
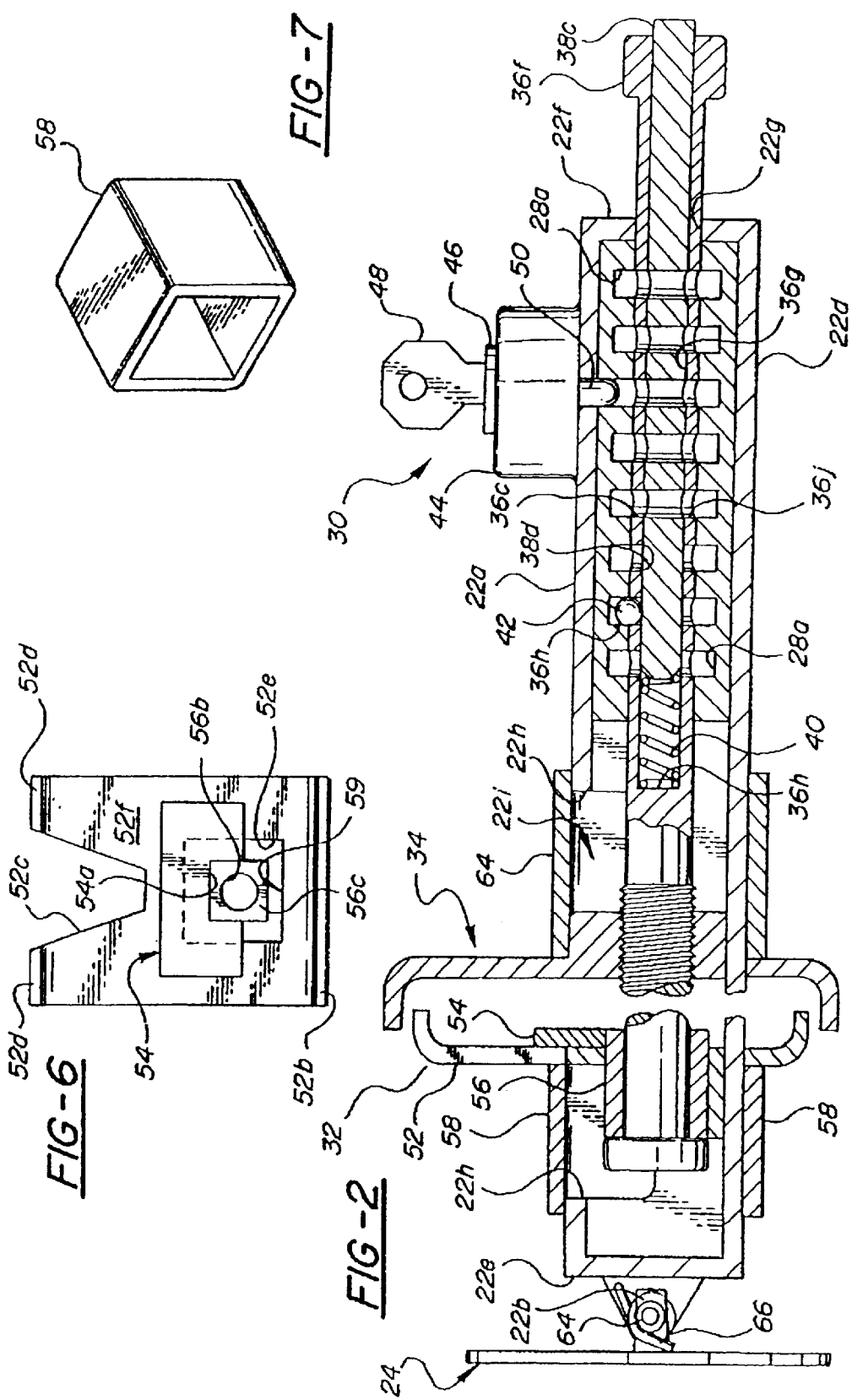
Figure 7:
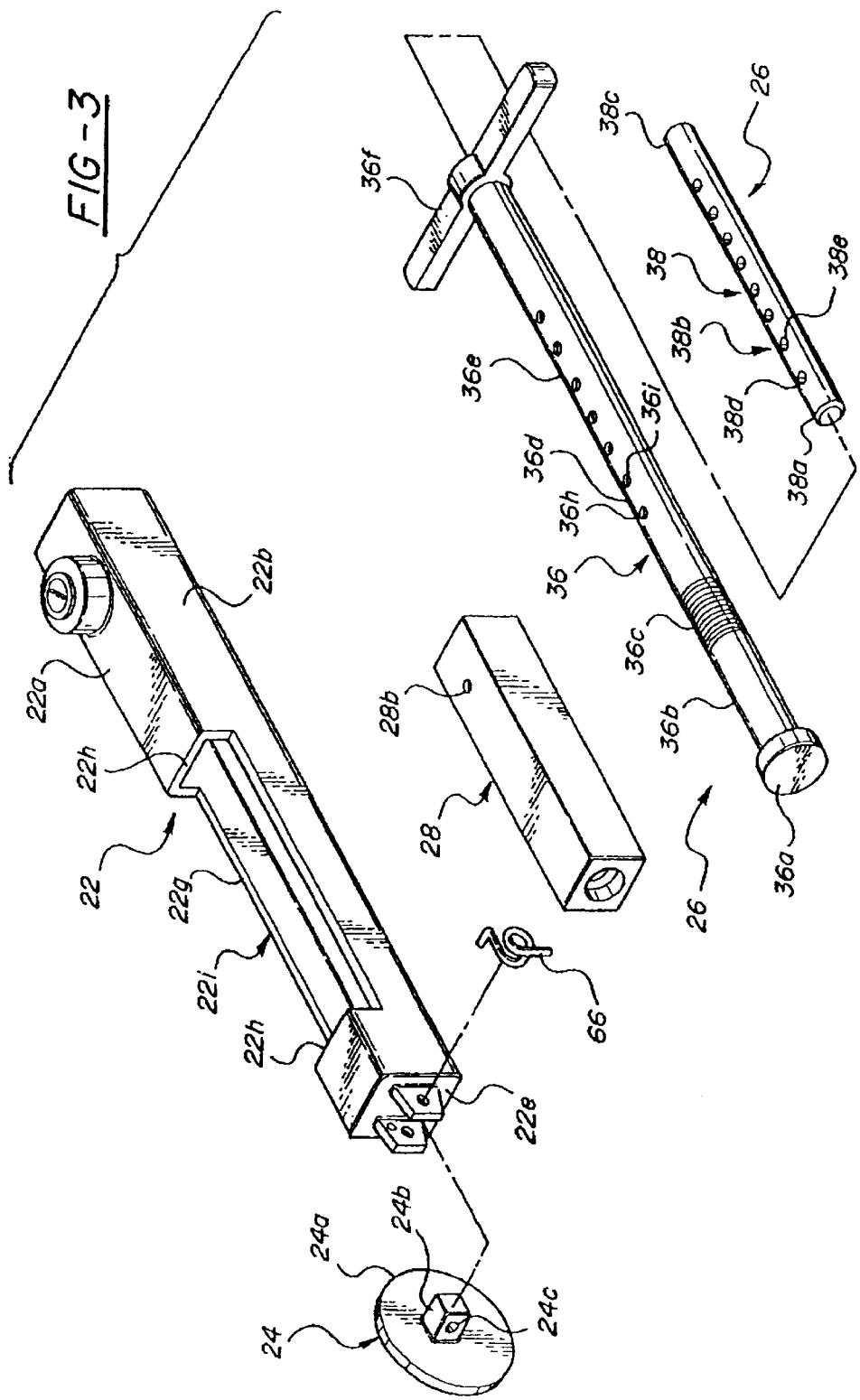
FIG. 7 is a perspective view of a cover sleeve forming a part of the front clamp structure.
Figure 8:
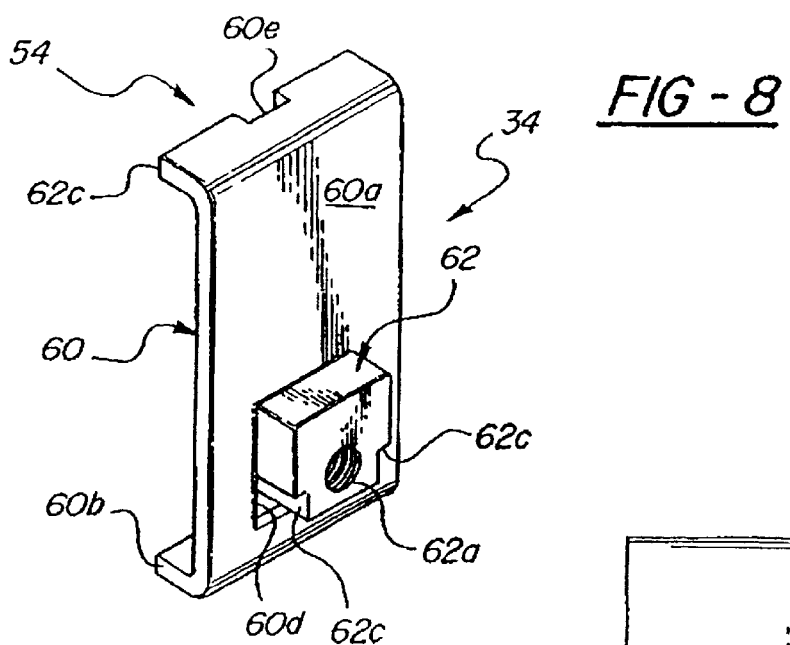
FIGS. 8, 9 and 10 are perspective, front and rear views of a rear clamp structure utilized in the invention device.
Figure 9:
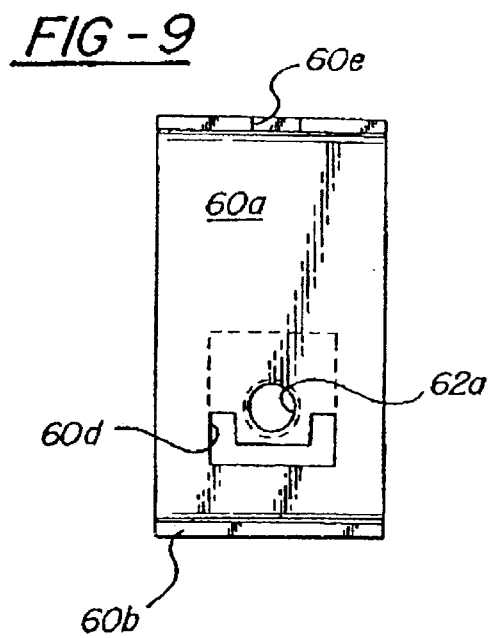
Figure 10:
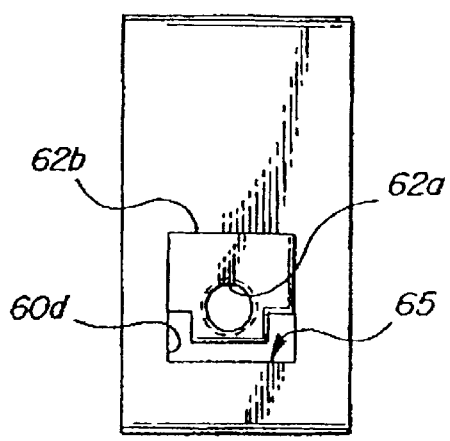
Figure 11:
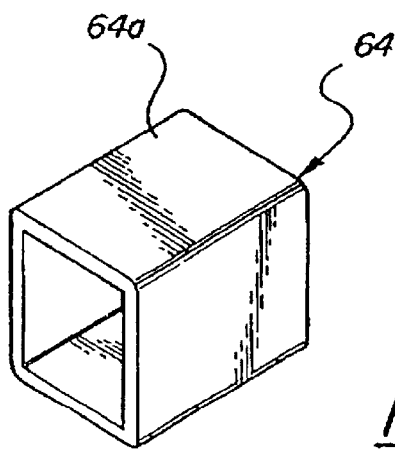
FIG. 11 is a perspective view of a cover sleeve forming a part of the rear clamp structure.
Figure 26:
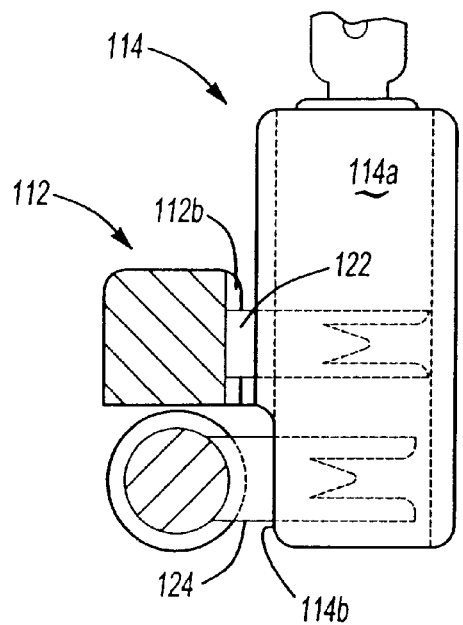
Figure 27:
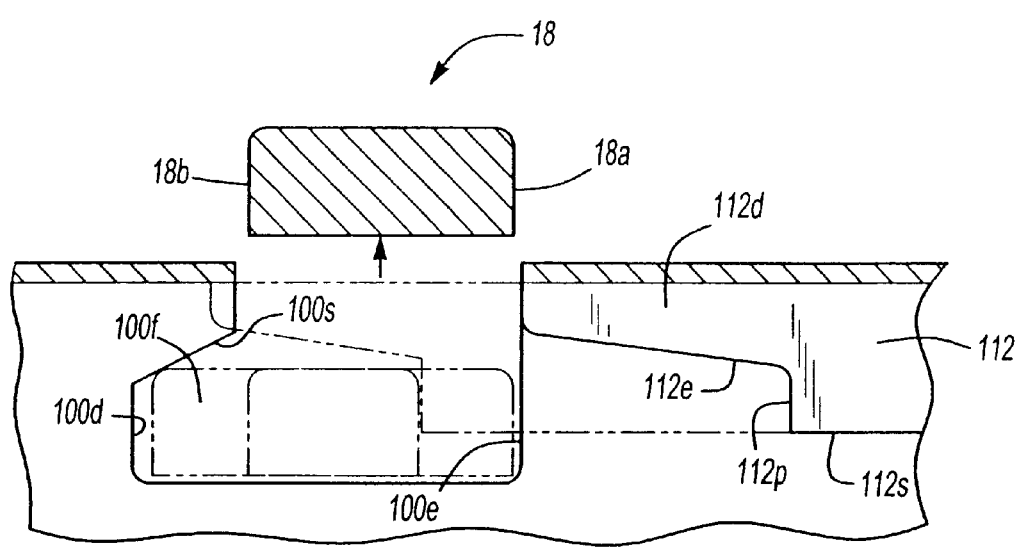

The first embodiment of the invention anti-theft device is seen in FIG. 1 in association with a motor vehicle including a floorboard 10, a fire wall 12, a transmission hump 14, and a brake pedal 16 including a pedal arm 18 and a pedal pad 20.

The anti-theft device includes an outer elongated housing or strut member 22, a foot 24, an inner elongated shaft assembly 26, a detent tube 28, a lock assembly 30 and a disabling structure including a front clamp structure 32 and a rear clamp structure 34. All of the elements of the device are formed of a suitable ferrous material.

Strut housing member 22 has an elongated tubular square cross-sectional configuration and includes an upper wall 22a, side walls 22b and 22c, a bottom wall 22d, a front wall end wall 22e and a rear end wall 22f. Side walls 22b and 22c are cut away at 22g, and top wall 22a is cut away at 22h, to form an upwardly facing opening 22i in the housing member 22.

Foot 24 comprises a circular plate including a main body plate portion 24a and a central lug portion 24b having a bore 24c.

Shaft assembly 26 includes a shaft 36, a push rod 38, a spring 40, and a detent ball 42.

Shaft 36 has a round cross-sectional configuration and includes a front end flange portion 36a, a journal or bearing portion 36b, a threaded portion 36c, a detent portion 36d, a locking portion 36e, and a rear handle portion 36f.

Detent portion 36d and locking portion 36e define a central bore 36g. Detent portion 36d includes a detent aperture 36h opening in central bore 36g. Locking portion 36e includes a plurality of pairs of aligned apertures 36i, 36j. Apertures 36i are axially aligned with detent aperture 36h and apertures 36j are diametrically opposed to apertures 35i.

Push rod 38 has a round cross-section and is sized to fit slidably in bore 36g. Push rod 38 includes a front portion 38a, a main body portion 38b, and a rear portion 38c. A detent hollow 38d is provided in front portion 38a and a plurality of axially spaced locking through bores 38e are provided in main body portion 38b in axial alignment with detent hollow 38d. The axial spacing of locking bores 38e corresponds to the axial spacing of aperture pairs 35i, 36j in shaft 36.

Spring 40 comprises a coil spring of known form and is sized to fit within bore 36g.

Detent ball 42 comprises a spherical ball member sized to seat in detent hollow 38d and sized to project upwardly out of, but not upwardly through, detent aperture 36h.

Detent tube 28 has a square outer cross-sectional configuration and a round inner cross-sectional configuration. Tube 28 is sized to fit within the square cross-sectional configuration of housing 22. A plurality of axially spaced annular detent grooves 28a are provided on the circular inner periphery of the detent tube. The inner periphery of the detent tube is sized to slidably receive shaft 36 and the detent grooves 28a are spaced axially by an amount corresponding to the spacing between detent apertures pairs 35i, 36j in tube 36 and locking bores 38e in push rod 38.

A locking pin bore 28b is provided in the top wall of the detent tube proximate the rear end of the tube. Bore 28b opens at its inner end in one of the detent grooves 28a.

Lock assembly 30 includes a housing 44 integral with the upper wall 22a of housing 22, a push button 46, a key 48, a pin tumbler mechanism (not shown) within housing 44, and a locking pin 50. Lock assembly 30 may, for example, be of the type available from the Chicago Lock Company of Chicago, Ill. as Part No. 1770.

Front clamp structure 32 includes a clamp plate 52, a mounting plate 54, a bushing or actuator 56, and a cover sleeve 58.

Clamp plate 52 includes a main body portion 52a of planar configuration, a lower flange portion 52b, a v-shaped cutout 52c in the main body portion defining a pair of upper flange portions 52d, and a square opening 52e in main body portion 52a having a size and configuration conforming to the size and configuration of housing 22.

Mounting plate 54 is suitably secured to the rear face 52f of the main body portion 52a of clamp plate 52 in overlying relation to opening 52e and defines a downwardly opening slot 54a.

Bushing 56 has a square outer periphery 56a and a round inner periphery or bore 56b sized to journal on the bearing portion 36b of shaft 36. Bushing 56 is mounted in slot 54a with its rear face 56c flush with the rear face of mounting plate 54 and the rear portion 52d of the bushing extending forwardly and axially through opening 52e. The lower portion of bushing 56 coacts with opening 52e to define a U-shaped groove 59 having a size and configuration conforming to the cross-sectional configuration of housing 22 proximate opening 22i.

Cover sleeve 58 has a square cross-sectional configuration and defines an inner periphery 58a corresponding in size and configuration to opening 52e in clamp plate 52 and sized to telescopically receive housing member 22. Sleeve 58 is suitably secured to the front face of clamp plate 52 in surrounding relation to opening 52e.

Rear clamp structure 34 includes a clamp plate 60, a nut or actuator 62 and a cover sleeve 64.

Clamp plate 60 includes a main body portion 60a, a lower flange portion 60b, an upper flange portion 60c, and a central rectangular open 60d in main body portion 60a. Nut 62 is positioned in opening 60d and includes a threaded central bore 62a sized to threadably coact with the threaded portion 36c of shaft 36, a main body portion 62b projecting rearwardly from plate 60, and shoulders 62c defined on opposite sides of main body portion 62b. Shoulders 62c coact with opening 60d and with the lower portion of main body portion 62b to define a U-shaped groove 65 having a size and configuration conforming to the cross-sectional configuration of housing 22 proximate opening 22i.

Cover sleeve 64 has a square tubular cross-sectional and is sized to telescopically receive housing member 22. The front end 64a of the sleeve is fitted over nut main body portion 62b and suitably secured thereto as by welding.

In the assembled relation of the various components of the invention anti-theft device, detent tube 28 is positioned in the rear end of housing 22 in abutting engagement with rear end wall 22f; shaft assembly 26 is positioned within housing member 22 with shaft 36 passing through an aperture 22g in rear end wall 22f for slidable receipt within detent tube 28; push rod 38 is slidably positioned within the hollow portion 36g of shaft 36 with rear end 38c projecting from the handle portion 36f of shaft 36 and with the forward end of the push rod 38a positioned proximate the blind end 36h of bore 36g; spring 40 is positioned in bore 36g between the forward end 38a of push rod 38 and bore blind end 36h so as to bear against the push rod; detent ball 42 is spaced from detent hollow 38d so that push rod 38 urges the detent ball outwardly into engagement with a detent groove 28a; nut portion 62b of rear clamp structure 34 threadably receives the threaded portion 36c of shaft 36 so as to mount clamp structure 34 on the shaft; bushing 56 of front clamp structure 32 is journaled on the bearing portion 36b of shaft 36 so as to mount clamp structure 32 on the shaft; the side walls 22b, 22c and bottom wall 22d of housing 22, proximate opening 22i, are slidably received in grooves 69 and 65 with nut shoulders 62c and the lower edge of mounting plate 54 guiding on housing edges 22g; front flange portion 36a of shaft 36 is positioned against the front end 56e of bushing 56; foot 24 is pivoted on the front end of housing 22 by a pin 65 passing through foot lug portion 24b and through aligned apertures in lugs 22h formed on the front wall 22e of housing 22; a coil spring 66 surrounds pin 65 and urges the foot to a rest position from which it may move pivotally against the bias of the spring; cover sleeve 58 extends forwardly from clamp plate 52 in telescopic surrounding relation to housing 22 and in covering relation to opening 22i; and cover sleeve 64 extends rearwardly from clamp plate 60 is surrounding telescopic relation to tube 22 and in covering relation to opening 22i.

The assembly of the components is facilitated by the fact that plates 52, 60, by virtue of their square opening 52e, 60d, may be slid over strut housing 22 to a position proximate opening 22i whereafter the nut 62 and bushing 56 may be positioned on shaft 36 with the shaft positioned within housing 22, whereafter the nut 62 and bushing 56 may be secured to the plates 52, 60. The assembled strut housing 22 and shaft 36 will be seen to constitute a strut assembly whose overall length may be selectively varied by a relative axial sliding movement of members 22 and 36 and which has a forward end defined by the forward end of the housing 22 and a rearward end defined by the rearward end of shaft 36.

Operation

In the use of the invention anti-theft device, and with the clamp structures 32 and 34 in relatively axially separated positions, the device is positioned below the brake pedal 20 with the foot 24 proximate the fire wall 12, whereafter the device is moved upwardly to move the clamp structures into coacting positions forwardly and rearwardly of the brake pad so that the clamp structures embrace the pad, whereafter push rod 38 is pushed in to move detent hollow 38d into alignment with detent ball 42 to allow the ball to drop into the detent hollow, whereafter strut housing 22 is slid forwardly relative to shaft 36 and relative to the disabling structure constituted by clamp structures 32 and 34 to firmly position foot 24 against the fire wall 12, whereafter push button 38c is released to allow spring 40 to move the push rod rearwardly to urge detent ball 42 into locking engagement with a detent groove 28a, whereafter handle 36f is utilized to turn shaft 36 within housing 22 so as to advance clamp structure 34 toward clamp structure 32 to firmly clamp and entrap brake pad 20 therebetween, whereafter push button 46 of lock assembly 30 is depressed to move locking pin 50 transversely downwardly for passage through aligned locking apertures 35i, 36j in shaft 36 to the dotted line position seen in FIG. 2, whereby to lock the shaft 36 and strut housing 22 together to preclude relative axial or rotational movement between the strut housing and the pedal disabling structure constituted by clamp structures 32 and 34. It will be seen that clamp structure 34 comprises a lock member which is moveable relative to clamp structure 32 to clamp and entrap the pedal pad therebetween. It will further be seen that with the clamp structures clamped against the front and rear faces of the brake pedal 20, pedal arm 18 passes through cutout 52i in clamp plate 52 and the rear edge 18a of the pedal arm is received in a notch or cutout 60e in the front edge of the top flange 62 of clamp plate 60.

In the modification of the first embodiment seen in FIGS. 12–16, the structure and method for precluding axial and rotational movement of the shaft is modified. Specifically, tie housing or strut 70 (replacing the strut housing 22) comprises a circular tube and includes an offset portion defining a horizontal rearwardly opening cavity 70a receiving a pin tumbler key lock 72 controlled by key 48; the shaft 74 (replacing the shaft 36) includes a plurality of axially spaced annular serrations 74a defining annular conical surfaces 74b; several successive serrations include hexagonal peripheral edges 74c; a detent wheel 76 is mounted on the hexagonal serrations with hexagonal central bore 76a of the wheel scated over the hexagonal edges 74c of the hexagonal serrations; detent wheel 76 is mounted for rotation in a bore 70b defined by strut 70 so that rotational movement of shaft 74 rotates wheel 76 in bore 70a, a plurality of circumferentially spaced axially extending teeth 76b are provided on the outer circumference of the wheel 76; key lock 72 includes a first striker 73 having a lower tip 78a arranged for detenting, ratcheting coaction with teeth 76b; and key lock 72 further includes a second striker 80 having a lower tip 80a arranged for detenting, ratcheting, coaction with serrations 74a.

In the operation of the modified locking structure of FIGS. 12–16, shaft 74 is held against forward movement relative to strut 70 by ratcheting coaction between striker 80 and serrations 74a and shaft 74 is held against clockwise rotation (as viewed in FIG. 14) by ratcheting coaction of striker 78 and detent wheel teeth 76b. It will be understood that strikers 78 and 80 extend from key lock 72 in the absence of key 48, are resiliently supported within the key lock so as to move selectively upwardly to pass serrations 74a and teeth 76b, and are returned to their retracted positions generally flush with the outer surface of the casing of key lock 72 upon insertion and turning of the key so that insertion and turning of the key has the effect of unlocking shaft 74 for both axial movement and rotational movement.

The second embodiment of the invention anti-theft device seen in FIGS. 17–27, like the first embodiment, is intended for use in association with a motor vehicle including a floorboard 10, a fire wall 12, a transmission hump 14 and a brake pedal assembly 16 including a pedal arm 18 and a pedal pad 20, all as shown in FIG. 1

The anti-theft device of FIGS. 17–27 includes a tube 100, a lock housing 102, a strut rod 104, a foot 105, an actuator rod 106, a handle 108, a gear 110, a lock bar 112, and a key lock 114.

Tube 100 has a generally rectangular cross-sectional configuration and includes an axially extending slot 100a in its upper wall 100b and an opening 100c provided in the top wall 100b and side walls 100d of the tube proximate the front end 100e of the tube. Opening 100c defines an entrance throat 100f and is generally sized to accommodate pedal arm 18 of the pedal assembly.

Lock housing 102 is a cast structure and is sized to telescopically receive the rear end 100g of the tube and to be secured to the rear end of the tube as by welding. Housing 102 defines a central rectangular passage 102a forming a continuation of the central rectangular passage of the tube and further defines a vertical key lock cavity 102b.

Strut rod 104 is formed of round bar stock and is slidably positioned within the hollow tube 100 along the lower wall 100h of the tube. Strut rod 104 includes a forward end portion 104h passing slidably through a plug 114 positioned in the front end 100e of the tube and a rearward end portion 104b defining an upwardly facing rack structure 104c.

Foot 105 is generally similar to foot 24 of the first embodiment and is suitably secured to the forward end portion 104a of strut rod 104 as for example by a press-on spherical, universal interconnection therebetween including a spherical front end configuration 104d on the extreme forward end of strut rod 104.

Actuator rod 106 is also formed of round bar stock and includes a forward end portion 106a defining a downwardly facing rack formation 106b, a rearward end portion 106c of round bar stock configuration, and an intermediate portion 106d defining a plurality of axial spaced annular serrations 106e each defining a conical annular surface 106f. Actuator rod 106 is positioned axially within tube 100 in overlying relation to strut rod 104 with the rear end 106c of the rod passing slidably through a bore 102c defined at the rear end of lock housing 102.

Gear 108 is mounted on a pin 118 secured in the side walls 10d of tube 100 and drivingly interengages rack structure 106b at its upper periphery and rack structure 104c at its lower periphery so that the gear functions to convert rearward movement of rod 106 to forward movement of rod 104.

Handle 110 has a T-configuration including a handle portion 110a and a hub portion 10b fixedly secured to the rear end portion 106c of rod 106. Pulling movement on handle 110 moves rod 106 rearwardly and thereby moves rod 104 forwardly to extend the forward portion 104a of the strut rod 104 forwardly from the front end 100e of tube 100.

Lock bar 112 has a generally rectangular cross-sectional configuration and includes a rear end portion 112a defining a ratcheting detent structure 112b along a side face 112c of the bar and a forward finger portion 112d having an angled lower face 112e. Lock bar 112 is sized to fit slidably in the upper region of tube 100 in overlying relation to actuator rod 106 and includes a handle 120 fixedly secured at its lower end to the bar and passing upwardly through slot 100a in tube 100.

Key lock 114 preferably has a pin tumbler configuration and includes a first or upper striker 122 and a second or lower striker 124. Strikers 122 and 124 are spring biased in known manner to an extended position and are movable to a retracted position substantially flush with the casing 114a of the key lock in response to insertion and turning of key 125. Upper or first striker 122 detentingly coacts with detent portion 112b of lock bar 112 so as to allow free forward axial movement of the lock bar and preclude return movement of the lock bar unless and until the striker is withdrawn by insertion and turning of key 125. Lower or second striker 124 similarly coacts with serrations 106e on actuator rod 106 to allow free rearward axial movement of rod 106 (and thereby forward axial movement of strut rod 104) but preclude return forward movement of the actuator rod (and return rearward movement of the strut rod) unless and until the striker is withdrawn by insertion and turning of key 125. As shown, striker 124 may project from a recessed flat 114b on the casing of the key lock to accommodate the configurations and disposition of the various parts.

Operation

In the use of the anti-theft device of the second embodiment of the invention (and with lock bar 112 in its retracted or open position and strut rod 104 in a retracted position) the device is positioned alongside pedal arm 18; the device is moved laterally to move pedal arm 18 through the entrance throat 100f to position the pedal arm within opening 100 so that the forward and rearward edges 100d and 100e of the opening 100 are positioned on opposite sides of the pedal arm in embracing relation to the pedal arm; handle 120 is utilized to slide lock bar 112 forwardly to a closed position wherein it obstructs entrance throat 100f and closes the opening 100 so as to entrap pedal arm 18 within opening 100; and handle 110 is pulled rearwardly to move actuator rod 106 rearwardly and move strut rod 104 forwardly to plant foot 105 firmly against the fire wall 12 of the vehicle. As lock bar 112 is moved forwardly to entrap the pedal arm, the bar is locked in its forward entrapping position by the coaction of striker 122 and detent structure 112b, and as strut rod 104 moves forwardly to plant foot 105 against the fire wall, the strut rod is locked in its forward position by the coaction of striker 124 and detent serrations 106e on actuator rod 106.

Opening 100 is configured to accommodate a wide variety of pedal arm cross-sectional configurations and includes a forward, undercut portion 100f bordered by forward edges 100d and an upwardly angled edges 100g. As the pedal arm 18 is moved laterally into opening 100 it initially assumes the position in the opening shown in dash lines in FIG. 27 whereafter, prior to forward movement of lock bar 112, the entire anti-theft device is moved rearwardly relative to the pedal arm to move the forward edge 18b of the pedal arm into undercut opening portion 100f and into engagement with front opening edges 100d (as seen in dotted lines) whereafter lock bar 112 is moved forwardly to its dash line position where finger 112 obstructs entrance throat 100f to close opening 100 and a shoulder 112f, defined between lower finger surface 112e and the lower face 112g of the bar, engages the rearward edge 18a of the arm to clamp the arm between shoulder 112f and edges 100d. The size and shape of opening 100 will be seen to accommodate pedal arms of varying cross-sectional configuration with the forward edge of the pedal arm in some cases engaging the forward edges load of the opening and in some cases engaging the upwardly angled opening edges 100g and with the rearward edge of the arm in some cases engaged by shoulder 112f and in some cases engaged by angled surface 112e.

In either disclosed embodiment of the anti-theft device, the brake pedal is totally disabled so that, even if someone is able to gain unauthorized entry into the vehicle, the vehicle still cannot be driven since the brake pedal cannot be depressed to release the brake/shift interlock and allow the transmission to be shifted out of the park position. Further, even if the brake/shift interlock can somehow be defeated and the vehicle transmission shifted into a drive gear, the vehicle is still undrivable since it has no brakes.

Unauthorized removal of the invention anti-theft device from the brake pedal, in either embodiment, is extremely difficult as compared to prior art anti-theft devices. For example, whereas a typical prior art anti-theft device can be defeated by shears or snipping devices, the sheer bulk and complexity of the invention device makes it extremely difficult, if not practically impossible, to achieve unauthorized removal of the invention device from the brake pedal.

Authorized removal of the device of the first embodiment from the brake pedal is accomplished by insertion of the key 48 in the push button 46 of the lock assembly and turning of the key to withdraw the locking pin 50, whereafter the shaft 36 may be rotated relative to the housing 22 to move the rear clamp structure away from the front clamp structure, whereafter push rod 38 may be depressed to drop detent ball 42 into detent hollow 36d to allow the tube 22 and shaft 36 to be relatively telescoped, whereafter the device can be dropped downwardly out of engagement with the brake pedal.

Authorized removal of the device of the second embodiment from the brake pedal is accomplished by insertion of key 48 into the key lock 114 and turning of the key which has the effect of moving both of the strikers to a retracted position so as to allow the lock bar to be retracted to its open position to allow the entrapped pedal arm to escape and so as to allow forward movement of actuator rod 106 to generate rearward movement of strut rod 104 to pull the foot away from the fire wall.

The invention will be seen to provide improved anti-theft devices that are relatively simple in construction and operation but yet which are extremely difficult to defeat once installed.

Whereas preferred embodiments of the invention have been illustrated and described in detail it will be apparent that various changes may be made in the disclosed embodiments without departing from the spirit or scope of the invention.

What is claimed is:

1. A motor vehicle anti-theft device installed in a vehicle having
   a brake pedal assembly operatively moveable relative to a wall comprising:
   a rod extending axially along a major first axis to a forward foot portion;
   a bar extending axially generally parallel to the rod and spaced away from the rod; a forward edge generally transverse to the rod and bar to define can opening among the forward edge, the rod and the bar, the forward edge positioned between the opening and the foot portion, one of the forward edge and the rod selectively moveable relative to the other axially generally parallel to the first axis to selectively entrap the portion of the brake pedal assembly among the rod, bar and forward edge wherein the rod and bar are disposed on opposite sides of the portion of the brake pedal assembly and wherein the rod extends axially along the first axis from the portion of the brake pedal assembly into contact with the wall.

2. The motor vehicle anti-theft device of claim 1 wherein the forward edge is positioned between the portion of the brake pedal assembly and the wall and is selectively lockable relative to the rod and bar to prevent axial movement of the forward edge relative to the rod and bar.

3. The motor vehicle anti-theft device of claim 1 wherein the forward edge is selectively lockable relative to the rod and bar to prevent axial movement of the forward edge relative to the rod and bar.

4. The motor vehicle anti-theft device of claim 1 wherein the rod and the bar are selectively movable relative to one another, the device further including a lock for selectively locking the rod and the bar relative to one another.

5. The method of preventing theft of a motor vehicle including the steps of:
   positioning a rod and a bar on opposite sides of a portion of a pedal assembly;
   positioning a forward edge between the portion of the pedal assembly and a wall of the vehicle forward of the pedal assembly;
   contacting the wall of the vehicle forward of the pedal assembly with an end of the rod, the rod extending along a major axis from the portion of the pedal assembly to the wall;
   causing relative movement generally parallel to the major axis between the forward edge and the rod and bar to contain the portion of the pedal assembly within the rod, bar and forward edge;
   locking the forward edge relative to the bar and rod to prevent the relative axial movement between the forward edge and the rod and bar.

6. The method of claim 5 further including the step of selectively locking the rod relative to the bar.

7. The method of claim 5 wherein the rod and the bar are each elongated and extend generally parallel to the major axis.

8. The method of claim 5 wherein the step of locking further includes the step of causing a striker to coact in a ratchet engagement with at least one of a plurality of axially spaced annular serrations, each defining a conical annular surface, in order to prevent relative movement between the forward edge and the rod and bar.

9. A motor vehicle anti-theft device comprising:
   an elongated strut extending along a major first axis to a forward foot portion;
   an elongated lock extending generally parallel to the strut and spaced away from the strut to form a space for receiving a portion of a brake pedal assembly therebetween;

an elongated rod having a plurality of axially spaced annular serrations each defining a conical annular surface;

a forward edge generally transverse to the strut and lock and moveable axially generally parallel to the first axis relative to the strut and lock to selectively lock the portion of the brake pedal assembly between the strut and the lock; and a striker coacting with the serrations on the rod to allow movement of the rod in one direction along the axis but prevent movement of the rod in an opposite direction along the axis.

10. The motor vehicle anti-theft device of claim 9 installed in a vehicle having a brake pedal assembly operatively moveable relative to a wall, wherein the strut and lock are disposed on opposite sides of the portion of the brake pedal assembly, the strut extends along the major first axis from the portion of the brake pedal assembly into contact with the wall and wherein the forward edge is positioned between the portion of the brake pedal assembly and the wall.

11. The device of claim 10 wherein the striker has a ratchet engagement with the rod to permit the relative movement between the forward edge and the bar in one direction but prevents relative movement between the forward edge and the bar in an opposite direction.

12. A motor vehicle anti-theft device comprising:

a first rod extending axially along a major first axis to a forward foot portion;

a bar extending axially generally parallel to the first rod and spaced away from the first rod;

a forward edge generally transverse to the first rod and the bar to define an opening among the forward edge, the first rod and the bar, the forward edge positioned between the opening and the foot portion, one of the forward edge and the first rod selectively moveable relative to the other axially generally parallel to the first axis to selectively entrap the portion of the brake pedal assembly among the first rod, bar and forward edge;

a second rod having a plurality of axially spaced annular serrations each defining a conical annular surface;

a lock including a striker coacting with the serrations to allow movement in one direction along the axis but prevent movement in an opposite direction along the axis.

13. The device of claim 12 wherein the striker permits the relative movement between the forward edge and the bar in the one direction but prevents relative movement between the forward edge and the bar in the opposite direction.

* * * * *

UNITED STATES PATENT AND TRADEMARK OFFICE
CERTIFICATE OF CORRECTION

PATENT NO. : 6,575,001 B1
DATED : June 10, 2003
INVENTOR(S) : Simon et al.

It is certified that error appears in the above-identified patent and that said Letters Patent is hereby corrected as shown below:

Column 10,
Line 5, "can" should be -- an --.

Column 11,
Line 17, "arc" should be -- are --.

Signed and Sealed this

Twenty-third Day of September, 2003

JAMES E. ROGAN
*Director of the United States Patent and Trademark Office*